United States Patent
Park et al.

(10) Patent No.: US 8,208,787 B2
(45) Date of Patent: Jun. 26, 2012

(54) SMMD MEDIA PRODUCING AND REPRODUCING APPARATUS

(75) Inventors: Wan Ki Park, Daejeon (KR); Chang-Sic Choi, Daejeon (KR); Hae Ryong Lee, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 481 days.

(21) Appl. No.: 12/580,336

(22) Filed: Oct. 16, 2009

(65) Prior Publication Data
US 2010/0135645 A1    Jun. 3, 2010

(30) Foreign Application Priority Data

Dec. 2, 2008   (KR) .................. 10-2008-0120901
Apr. 8, 2009   (KR) .................. 10-2009-0030385

(51) Int. Cl.
*H04N 9/80* (2006.01)

(52) U.S. Cl. ...................................... 386/239; 386/248
(58) Field of Classification Search .................. 386/239, 386/248, 278, 280, 283, 326
See application file for complete search history.

(56) References Cited

U.S. PATENT DOCUMENTS
2010/0104255 A1*   4/2010   Yun et al. .................. 386/66

FOREIGN PATENT DOCUMENTS
KR       1020050045700 A    5/2005
* cited by examiner

*Primary Examiner* — Robert Chevalier
(74) *Attorney, Agent, or Firm* — Ladas & Parry LLP

(57) ABSTRACT

A SMMD media producing apparatus includes: a pre-processor for extracting first media data and produces MXF media data with adjusted resolution using media data of an MXF format; and a neo-data producer for extracting second media data from the MXF media data with the adjusted resolution and produces neo-data to be added to the extracted second media data. The apparatus further includes a media publisher for producing SMMD media data using the neo-data produced by the neo-data producer and the first media data.

13 Claims, 2 Drawing Sheets

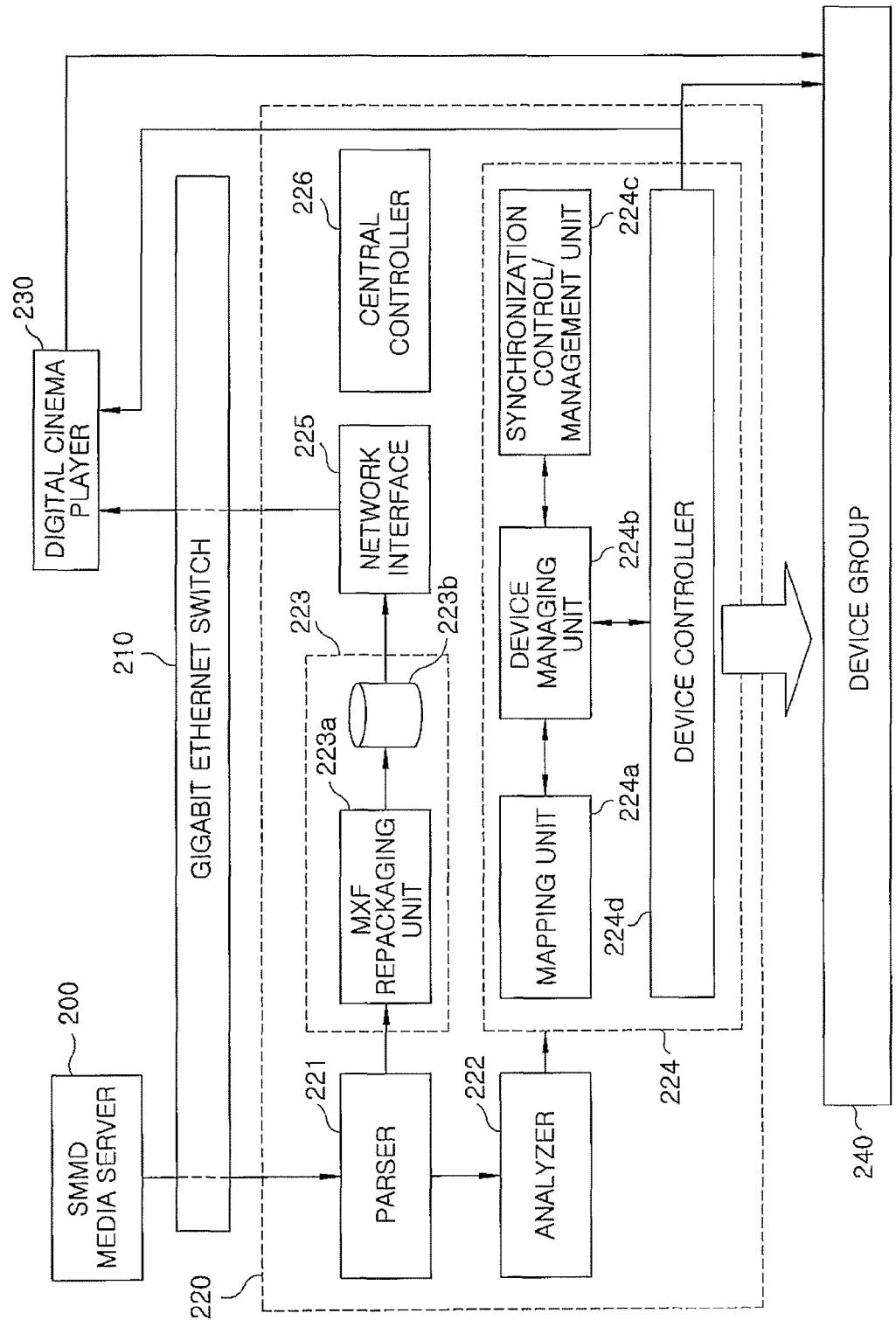

US 8,208,787 B2

SMMD MEDIA PRODUCING AND REPRODUCING APPARATUS

CROSS-REFERENCE(S) TO RELATED APPLICATION

The present invention claims priority of Korean Patent Applications No. 10-2008-0120901, filed on Dec. 2, 2008 and Korean Patent Application No. 10-2009-0030385, filed on Apr. 8, 2009 which are incorporated herein by reference.

FIELD OF THE INVENTION

The present invention relates to a SMMD (Single Media Multi Device) media producing and reproducing apparatus for processing 2K (2048×1080) or 4K (4096×2048) M-JPEG (Motion JPEG)-based MXF (Material eXchange Format) media, which are high resolution images for digital cinema, in a SMMD system which reproduces one medium for an extended media service in interlocking with various devices.

BACKGROUND OF THE INVENTION

Conventionally, a media service for cinema is for video or audio of simple A/V data.

As MPEG-4-based SMMD services have been provided with recent development of technologies, an effect device control method has been introduced which uses effect data to maximize A/V media and effects of media, namely, neo-data.

However, the conventional MPEG-4-based systems are not capable of processing 2K or 4K-class high resolution and players for digital cinema only can not offer the SMMD services.

SUMMARY OF THE INVENTION

Therefore, the present invention provides SMMD media producing and reproducing apparatus capable of processing high resolution media for digital cinema, and therefore, media services using media having a new structure which integrates effect information into existing media including moving pictures, audio and texts can be provided to a user.

In accordance with an aspect of the present invention, there is provided a SMMD media producing apparatus including: a pre-processor that extracts first media data and produces MXF media data with adjusted resolution using media data of an MXF format; a neo-data producer that extracts second media data from the MXF media data with the adjusted resolution and produces neo-data to be added to the extracted second media data; and a media publisher that produces SMMD media data using the neo-data produced by the neo-data producer and the first media data.

In accordance with another aspect of the invention, there is provided a SMMD media reproducing apparatus including: a parser that de-packages SMMD media data received from the external to separate the SMMD media data into neo-data and neo-MXF media data; an analyzer that analyzes the neo-data to separate effect data for each device from the neo-data; an MXF reproducing unit that reproduces the neo-MXF media data from which the neo-data is separated; and an effect data processing unit that controls a corresponding device using the effect data for each device upon reproducing the neo-MXF media data.

BRIEF DESCRIPTION OF THE DRAWINGS

The above and other objects and features of the present invention will become apparent from the following description of preferred embodiments given in conjunction with the accompanying drawings, in which:

FIG. 2 is a block diagram showing a SMMD media reproducing apparatus and its peripheral configuration according to an embodiment of the present invention.

DETAILED DESCRIPTION OF THE EMBODIMENTS

Figure 1:
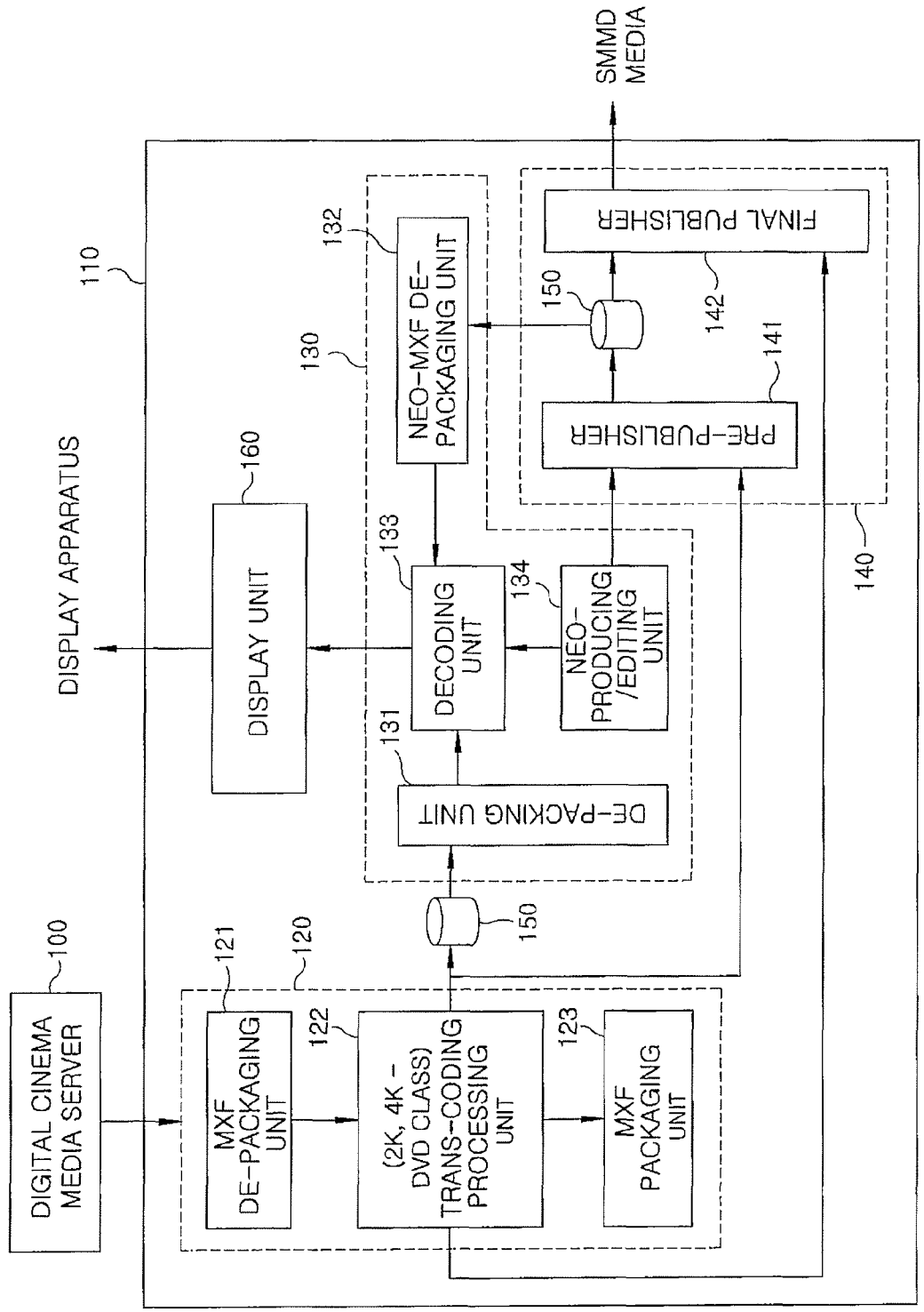
FIG. 1 is a block diagram showing a SMMD media producing apparatus according to an embodiment of the present invention.

Hereinafter, embodiments of the present invention will be described in detail with reference to the accompanying drawings.

In the following detailed description of the present invention, concrete description on related functions or constructions will be omitted if it is deemed that the functions and/or constructions may unnecessarily obscure the gist of the present invention.

FIG. 1 is a block diagram showing a SMMD media producing apparatus according to an embodiment of the present invention.

Referring to FIG. 1, a SMMD media producing apparatus 110 includes a pre-processor 120 that extracts high quality M-JPEG media data from original digital cinema media data having a MXF format, which are received from a digital cinema media server 100, and produces MXF media data with adjusted resolution, a neo-data producer 130 that extracts M-JPEG media data from the MXF media data with the adjusted resolution and produces neo-data to be added to the extracted M-JPEG media data, and a media publisher 140 that produces SMMD media data using the neo-data produced in the neo-data producer 130 and the high quality M-JPEG media data extracted in the pre-processor 120.

In addition, the SMMD media producing apparatus 110 of the present invention further includes a storage medium 150 that buffers/stores data, and a display unit 160 that displays decoded data on a display apparatus (not shown).

Here, the media data having the MXF format provided from the digital cinema media server 100 may be M-JPEG-based MXF data, for example, 2K or 4K high quality data.

The pre-processor 120 includes an MXF de-packaging unit 121 that extracts high quality M-JPEG media data from the media data having the MXF format, a trans-coding processing unit 122 that produces media data resized by adjustment of resolution of the high quality M-JPEG media data, and an MXF packaging unit 123 that packages the resized media data into MXF to produce MXF media data with adjusted resolution.

The trans-coding processing unit 122 produces the resized media data by down-grading the resolution of the 2K or 4K high quality M-JPEG media data to a DVD class and provides the produced resized media data to the MXF packaging unit 123.

The resized media data and the MXF media data with the adjusted resolution, which are produced in the pre-processor 120, may be temporarily stored in the storage medium 150.

The storage medium 150 is stored with neo-MXF media data in which DVD-class neo-data are included. In other words, the neo-MXF media data in which DVD-class neo-data are included may be previously created data or may be updated by the media publisher 140.

The neo-data producer 130 includes de-packaging unit 131 that extracts M-JPEG media data from the MXF media data with the adjusted resolution, a neo-MXF de-packaging unit 132 that extracts neo-M-JPEG media data from the neo-MXF media data with the adjusted resolution stored in the storage medium 150, a decoding unit 133 that decodes the neo-M-JPEG media data or the extracted M-JPEG media data, and a neo-producing/editing unit 134 that edits neo-data produced through comparison between the decoded neo-M-JPEG media data and the extracted M-JPEG media data.

The decoding unit 133 decodes the M-JPEG media data output from the de-packaging unit 131 and then displays it on the display apparatus (not shown) such as LCD through the display unit 160, or decodes the neo-M-JPEG media data and then displays it on the display apparatus through the display unit 160.

The neo-producing/editing unit 134 provides an interface that can edit or produces neo-data based on a picture displayed on the display apparatus through the display unit 160, for example, a menu interface for neo-data adjustment.

The neo data produced or edited by the neo-producing/editing unit 134 is provided to the media publisher 140.

The media publisher 140 includes a pre-publisher 140 that produces neo-MXF media data with resolution adjusted by including the edited or produced neo-data provided from the neo-producing/editing unit 134 in the MXF media data with the adjusted resolution, and uses it to update the neo-MXF media data stored in the storage medium 150, and a final publisher 142 that replaces the neo-MXF media data (media data with low resolution) produced or edited by the neo-producing/editing unit 134 with 2K or 4K media and produces SMMD media data in which the neo-data are included.

An apparatus for reproducing the SMMD media data produced by the above-constructed SMMD media producing apparatus is as shown in FIG. 2.

FIG. 2 is a block diagram showing a SMMD media reproducing apparatus and its peripheral configuration according to an embodiment of the present invention. The block diagram of FIG. 2 is shown to include a SMMD media server 200 provided with a media database in which SMMD media data are stored, a SMMD media reproducing apparatus 220 that receives SMMD media data through a device such as a gigabit Ethernet switch 210 and separates and processes the SMMD media data into neo-data and neo-MXF media data, a digital cinema player 230 that reproduces the neo-MXF media data from the SMMD media reproducing apparatus 220, and a device group 240 including, e.g., a curtain, an illumination, a speech, a sound, an electric fan and a film projector and controlled by the neo-data.

As shown in FIG. 2, the SMMD media reproducing apparatus 220 includes a parser 221 that de-packages the SMMD media data transmitted from the SMMD media server 200 and separates it into neo-data and neo-MXF media data, an analyzer 222 that analyzes the neo-data and separates effect data for each device from the neo-data, an MXF reproducing unit 223 that reproduces the neo-MXF media data from which the neo-data are separated, an effect data processing unit 224 that controls a corresponding device using the effect data for each device of the device group 240 when reproducing the neo-MXF media data, a network interface 225 that communicates with the external SMMD media server 200 and digital cinema player 230 through the gigabit Ethernet switch 210, and a central controller 226 that controls the SMMD media reproducing apparatus as a whole.

The parser 221 de-packages the SMMD media data for providing a SMMD service, that is, neo-MXF media data with an MXF format, extracts neo-data from the SMMD media data, provides it to the analyzer 222, and provides neo-MXF media data without the neo-data to the MXF reproducing unit 223.

The MXF reproducing unit 223 includes an MXF repackaging unit 223a that converts the neo-MXF media data, from which the neo-data are separated, into media data of an MXF format suitable to the digital cinema player 230, and a storage medium 223b which is a buffering means for securing device synchronization and time based on the neo-data. Here, the storage medium 223b may be a hard disk or a memory.

The effect data processing unit 224 includes a mapping unit 224a that maps the effect data for each device to a corresponding device, a device managing unit 224b that manages devices within the device group 240, a synchronization control/management unit 224c that controls synchronization between the corresponding device and the effect data mapped to the corresponding device, and a device controller 224d that controls the corresponding device mapped to the effect data under control for synchronization by the synchronization control/management unit 224c.

Here, the mapping unit 224a maps devices to corresponding effect data in a one-to-one correspondence. For example, illumination-related effect data may be mapped to corresponding illumination devices within the device group 240, and audio-related effect data may be mapped to corresponding audio devices within the device group 240.

While the present invention has been particularly shown and described with reference to exemplary embodiments thereof, it will be understood by those skilled in the art that various changes in form and details may be made therein without departing from the scope of the present invention.

What is claimed is:

1. A SMMD media producing apparatus comprising:
    a pre-processor for extracting first media data and produces MXF media data with adjusted resolution using media data of an MXF format;
    a neo-data producer for extracting second media data from the MXF media data with the adjusted resolution and produces neo-data to be added to the extracted second media data; and
    a media publisher for producing SMMD media data using the neo-data produced by the neo-data producer and the first media data.

2. The SMMD media producing apparatus of claim 1, wherein the pre-processor includes:
    an MXF de-packaging unit for extracting the first media data from the media data with the MXF format;
    a trans-coding processing unit for producing media data resized through adjustment of resolution of the first media data; and
    an MXF packaging unit for producing MXF media data with the adjusted resolution by packaging the resized media data into MXF.

3. The SMMD media producing apparatus of claim 1, wherein the media publisher further includes a pre-publisher for producing neo-MXF media data by including the produced neo-data in the MXF media data with the adjusted resolution and provides the neo-MXF media data to the neo-data producer.

4. The SMMD media producing apparatus of claim 3, wherein the neo-data producer includes:
    a neo-MXF de-packaging unit for extracting neo-M-JPEG media data from the neo-MXF media data with the adjusted resolution received from the pre-publisher;
    a decoding unit for decoding the neo-M-JPEG media data and the extracted second media data; and
    an editing unit for editing the produced neo-data through comparison between the decoded neo-M-JPEG media data and the extracted M-JPEG media data.

5. The SMMD media producing apparatus of claim 4, further comprising a display unit for displaying the decoded neo-M-JPEG media data and the extracted second media data 6. The SMMD media producing apparatus of claim 5, wherein the editing unit provides an interface for editing the produced neo-data based on a picture displayed through the display unit.

7. The SMMD media producing apparatus of claim 1, wherein the first media data and the second media data have an M-JPEG format.

8. A SMMD media reproducing apparatus comprising:
  a parser for de-packaging SMMD media data received from the external to separate the SMMD media data into neo-data and neo-MXF media data;
  an analyzer for analyzes the neo-data to separate effect data for each device from the neo-data;
  an MXF reproducing unit for reproduces the neo-MXF media data from which the neo-data is separated; and
  an effect data processing unit for controlling a corresponding device using the effect data for each device upon reproducing the neo-MXF media data.

9. The SMMD media reproducing apparatus of claim 8, further comprising a network interface that performs wired/wireless communication with the external or performs communication with a digital cinema player.

10. The SMMD media reproducing apparatus of claim 9, wherein the MXF reproducing unit further includes an MXF repackaging unit for converting the neo-MXF media data, from which the neo-data is separated, into media data of an MXF format without the neo-data, and
  wherein the MXF reproducing unit reproduces the media data of the MXF format using the digital cinema player connected to the MXF reproducing unit through the network interface.

11. The SMMD media reproducing apparatus of claim 10, wherein the MXF reproducing unit further includes a buffer for temporarily storing the media data of the MXF format to secure control synchronization and time when the effect data processing unit processes the corresponding device.

12. The SMMD media reproducing apparatus of claim 11, wherein the buffer is a hard disk or a memory.

13. The SMMD media reproducing apparatus of claim 8, wherein the effect data processing unit further includes:
  a mapping unit for mapping the effect data for each device to the corresponding device;
  a device managing unit for managing a device connected to the SMMD media reproducing apparatus;
  a synchronization control/management unit for controlling synchronization between the corresponding device and the effect data mapped to the corresponding device; and
  a device controller for controlling the corresponding device mapped to the effect data according to synchronization control by the synchronization control/management unit.

* * * * *